United States Patent [19]

Kehrman et al.

[11] 4,271,407
[45] Jun. 2, 1981

[54] TUNNEL ROOF MONITOR EMPLOYING AN INDUCTION COIL EXTENSOMETER

[75] Inventors: Robert F. Kehrman, Louisville; Arnold J. Farstad; Michael G. Gibbons, both of Boulder; David L. Swigert, Fort Collins, all of Colo.

[73] Assignee: Westinghouse Electric Corp., Pittsburgh, Pa.

[21] Appl. No.: 93,324

[22] Filed: Nov. 13, 1979

[51] Int. Cl.³ .......................................... G08B 21/00
[52] U.S. Cl. .................................. 340/690; 73/784; 331/65
[58] Field of Search ..................... 340/690; 73/784; 331/65

[56] References Cited

U.S. PATENT DOCUMENTS

| | | | |
|---|---|---|---|
| 3,046,535 | 7/1962 | Philbin et al. | 331/65 |
| 3,111,655 | 11/1963 | Kotarsky et al. | 340/690 |
| 3,594,773 | 7/1971 | Conkle et al. | 340/690 |
| 3,735,244 | 5/1973 | Gumtau et al. | 331/65 |
| 3,891,918 | 6/1975 | Ellis | 331/65 |
| 3,960,009 | 6/1976 | Roepke et al. | 73/784 |
| 3,973,191 | 8/1976 | Zabler | 331/65 |
| 4,156,236 | 5/1979 | Conkle | 340/690 |

Primary Examiner—Glen R. Swann, III
Attorney, Agent, or Firm—M. P. Lynch

[57] ABSTRACT

A ferrite core is suspended from the base of a borehole in a tunnel roof structure and is positioned within coil turns located at the roof surface such that movement of the roof structure causes displacement of the core with respect to the coil turns thus producing a change in inductance. The coil and core are incorporated as a frequency-determining element in an LR oscillator. Therefore, movement of the tunnel roof structure is reflected as a change in the frequency of the oscillator. This frequency is monitored and, if the change exceeds a predetermined threshold, an alarm is given. Several methods of suspending the core in the coil are disclosed, one of which allows for a non-verticle borehole.

8 Claims, 5 Drawing Figures

TUNNEL ROOF MONITOR EMPLOYING AN INDUCTION COIL EXTENSOMETER

BACKGROUND OF THE INVENTION

In tunnel structures, such as exist in subsurface mining operations, there is a critical requirement for monitoring the condition of the roof structure in order to assure safety of the personnel operating in the mine. Various strain gauge and deflection monitoring devices are traditionally employed to detect movement or sagging in the roof structure to provide an advanced warning of potential collapse of the roof structure.

SUMMARY OF THE INVENTION

There is described herein with reference to the accompanying drawing a novel technique employing the use of a borehole extensometer to monitor movement, or sag, in a tunnel roof to provide an accurate and reliable advance warning of a potential roof collapse. The disclosed borehole extensometer utilizes a low cost coil element and a ferrite-core element on an arrangement such that minute motion in the tunnel roof is translated into readable oscillator frequencies via inductance changes in the coil/core combination. The oscillator frequencies thus generated are directly related to the relative displacement between the coil and ferrite-core and thus, the coil/core combination provides a low cost means of monitoring roof motion in such facilities as active underground mines and transportation tunnels. The rate of the motion detected is used in calculating the rate of natural tunnel closures and allows mine and tunnel engineers to plan for proper roof support.

BRIEF DESCRIPTION OF THE DRAWING

The invention will become more readily apparent from the following exemplary description in connection with the accompanying drawings.

DESCRIPTION OF THE PREFERRED EMBODIMENT

Figure 1:
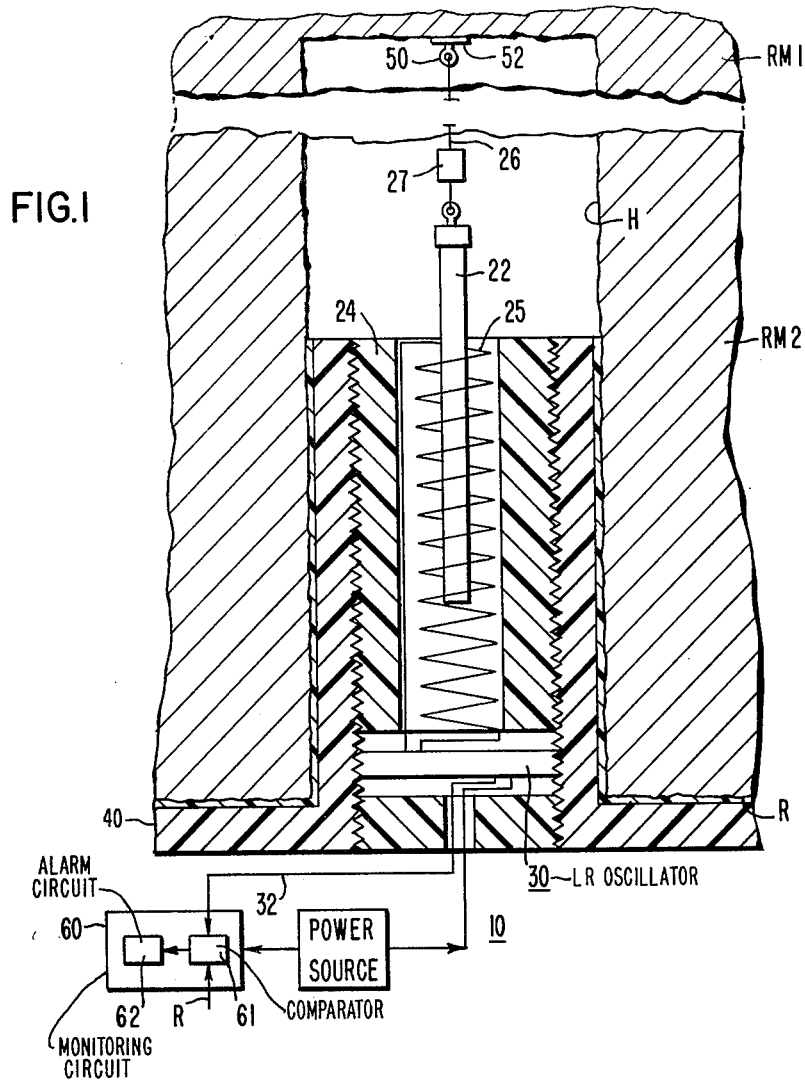
FIG. 1 is a sectioned pictorial illustrations of an embodiment of the invention.

Referring to the schematic illustration of FIG. 1, there is illustrated a borehole extensometer 10 secured within a borehole H of a rock mass RM having a surface R which corresponds to the roof of a tunnel.

The borehole extensometer 10 consists of a coil/core arrangement 20 having a movable ferrite-core 22 suspended within a coil housing 24 having coil windings 25 by a wire 26 which extends from the ferrite-core 22 to a fixture 50 anchored deep in the rock mass RM via an anchor member 52. A weight 27 is attached to the wire 26 to provide the desired tension. An LR oscillator circuit 30 is positioned within the coil/housing 24 and is connected to the leads of the coil windings 25 such that a change in the inductance resulting from relative movement of the ferrite-core 22 with respect to the coil windings 25 is manifested as a change in the resonant frequency of the oscillator circuit 30. This change in frequency is communicated to a remote monitoring circuit 60 by the oscillator leads 32. The resonant frequency of the LR oscillator circuit 30 is determined by the inductance of the coil/core arrangement 20.

The coil housing 24 is secured within a tubular flanged housing 40 which in turn is secured to the surfaces of the borehole H and the roof surface R of the rock mass RM.

The borehole H is drilled sufficiently deep into the rock mass RM to assure that the fixture 50 is secured in a more competent, or stable, rock formation RM1 than that at the rock formation RM2 at the surface R. Thus, in the event of a movement of the tunnel roof, the rock formation RM2 will exhibit greater movement than that of rock mass RM1 which results in a relative displacement of the coil element 24 with respect to the core 22.

According to the text "Rock Mechanics and Design of Structures in Rock", by L. Obert and W. I. Duval, published by John Wiley and Sons, Inc., 1967, gravitational, and possibly tectonic forces, act on the rock formations surrounding underground excavations in such a direction as to close the tunnel opening. A part of the closure results from elastic (time-independent) deformations apart from any elastic (time-dependent) deformations, and in many instances, a substantial part of the closure is due to the fracturing of the overlying rock which falls into the tunnel opening. Collectively, these effects tend to produce a lowering of the rock overlying the tunnel opening, and this process is referred to as subsidence. The first manifestations of subsidence may be convergence or a succession of local fractures in the rock surrounding the tunnel opening, such as repeated sloughing from the immediate roof. This text further points out that the processes of subsidence include both time dependent and time independent characteristics of the rock and depend on stress conditions created in the rock by the geometry of the tunnel opening.

Figure 2:
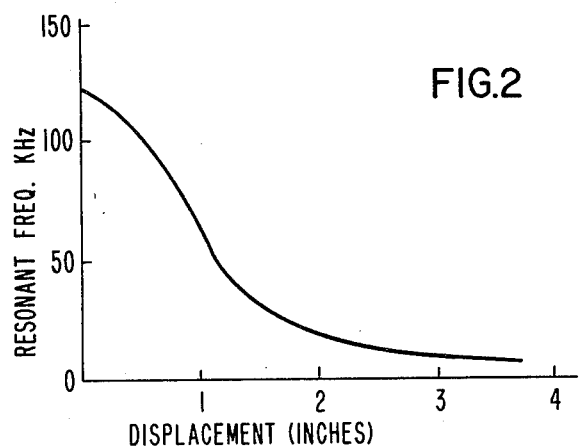
FIG. 2 is a graphical illustration of the operation of the borehole extensometer of FIG. 1.

The initial adjustment, calibration, or zero setting, of the borehole extensometer 10 is achieved by positioning the coil/housing 24 with respect to the ferrite-core 22 which is suspended from the fixture 50. The core/coil arrangement 20 operates similar to a slug-tuned coil in which the location of the core 22 relative to the coil windings 25 determines the inductance of the core/coil arrangement. When there is a displacement, or sagging, of the roof R, the coil element 24 moves relative to the core 22 and consequently a change in inductance occurs. A calibration curve, similar to the one shown in FIG. 2, is used to relate oscillator frequency to displacement of the roof R. This displacement information, is transmitted as a change in frequency by the oscillator circuit 30 to circuit 60 which may consist of a comparator circuit 61 which transmits an alarm indication to alarm circuit 62 if the roof displacement exceeds a predetermined reference threshold R.

An experimental verification of the operation of the borehole extensometer 10 for monitoring displacement of tunnel roofs at an operating frequency in the range between 1 kHz and 100 kHz was conducted with specifications of the core 22 and coil turns 25 as follows:

| | Coil |
|---|---|
| Material | Ferrite |
| Permeability | $\mu = 800$ |
| Length | 7.5 inches |
| Diameter | 0.375 inches |
| | Coil |
| Wire | #24 AWG |
| Turns | $\approx 500$ |
| Length | 3.0 inches |

| -continued | |
|---|---|
| Diameter | 0.5 inches ID, 1.0 inches OD |

While the discussion and description with respect to FIG. 1 has been limited to a single borehole extensometer 10, it is apparent that in any tunnel structure numerous such monitoring devices would be secured in various boreholes within the roof structure and the outputs of these separate borehole extensometers displayed on an annunciator panel. The electrical excitation for both the oscillator circuit 30 and the remote monitoring circuit 60 is provided by a single power source which may consist of battery power sources, located in proximity to the borehole extensometer 10.

Figure 3:
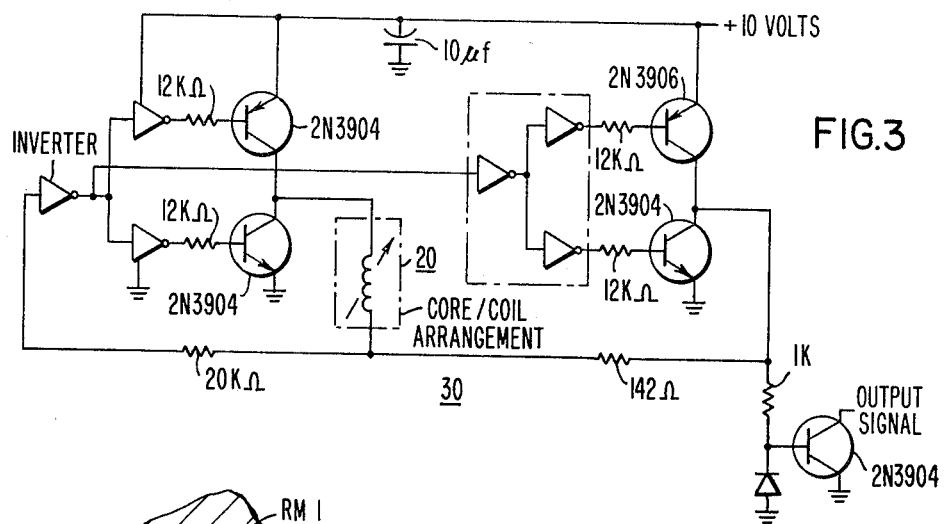
FIG. 3 is a schematic illustration of a typical embodiment of the RL oscillator circuit of FIG. 1.

While either an LC or an LR oscillator circuit can be employed to implement the oscillator circuit 30 it has been determined experimentally that an LR circuit, such as that typically illustrated in FIG. 3, is preferred. The LR oscillator circuit provides a linear output in response to frequency change and it does not exhibit the operational instability found in the capacitor of an LC oscillator circuit. The two groups of three inverters of FIG. 3 can be implemented by the commercially available Motorola Hex Schmitt Trigger Circuit MC 14584B. The period of the output frequency of circuit 30 varies in direct proportion to the inductance of the coil winding 25.

Figure 5:
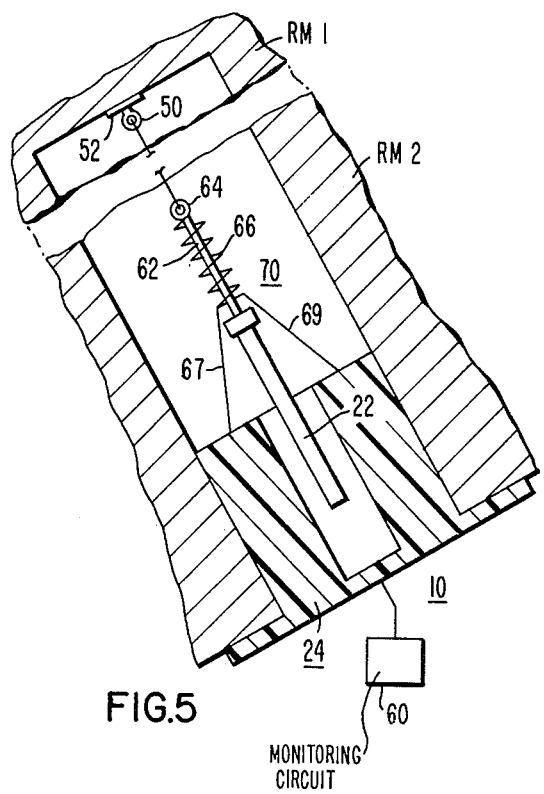
FIGS. 4 and 5 are alternate embodiments of the invention of FIG. 1.
Figure 4:
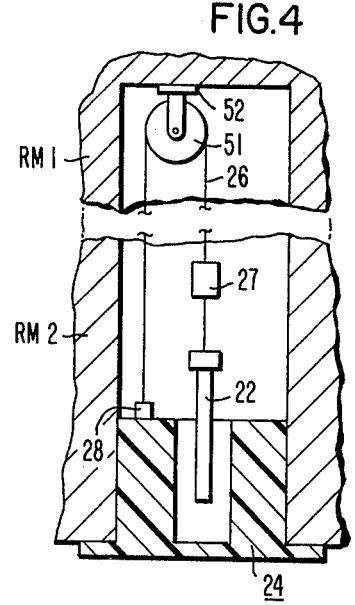

Alternate embodiments of the extensometer 10 are illustrated in FIGS. 4 and 5.

Referring to FIG. 4, the fixture 50 of FIG. 1 is replaced by a pulley 51, and the core 22 is suspended from a line 26 which extends from the core 22, through the pulley 51 and secured to an adjustable slug 28 which is an integral part of the coil housing 24. While the movement of the core 22 with respect to the coil winding 25 is the same as described above, the positioning of the core 22 for calibration purposes is controlled by the adjustable slug 28.

While the embodiments of the extensometer 10 of FIGS. 1 and 4 are suitable for vertical borehole applications, the application of the extensometer 10 for non-vertical uses, such as a tunnel with an arch roof, requires different design details. In the non-vertical deployment of the extensometer 10 of FIG. 5, the tension weight 27 of FIG. 1 is eliminated and a spring tension assembly 70 is incorporated. The assembly 60 consists of a rod 62 extending from the ferrite core 22 and having a fixture 64 at the opposite end to which the suspension wire 26 is attached. A helical spring member 66 is coaxially disposed about the rod 62 with one end secured to the fixture 64. Lead wires 67 and 69 extend from the opposite end of the spring member 66 to the coil housing 24 and are of a length to maintain the spring member 66 in sufficient tension to maintain the core 22 properly positioned with the core housing 24 regardless of the orientation of the borehole H with respect to the vertical. The material and design of spring 66 is such that it will not impede the relative movement of the coil housing 24 with respect to the core 22 in the event of movement of the rock formation RM2 within which the coil housing 24 is secured.

We claim:

1. Apparatus for detecting the movement of a tunnel roof structure to warn of potential roof collapse, comprising:

a detector means including a core element positioned within and inductively coupled to a coil element, said detector means being positioned within a borehole in the roof structure of a tunnel, said core element being secured within a first rock formation and said coil element being secured within a second rock formation such that movement of either of said rock formations with respect to the other results in a relative displacement of said core element with respect to said coil element, said displacement producing a change in the inductance of said detector means, and means operatively connected to said detector means to monitor said change of inductance as an indication of movement of said roof structure.

2. Apparatus as claimed in claim 1 wherein said coil element is a ferrite core.

3. Apparatus as claimed in claim 1 wherein said means for monitoring said change of inductance includes an LR oscillator circuit means for translating said change in inductance to a change in frequency, and including frequency responsive means for providing an indication of the movement of said roof structure.

4. Apparatus as claimed in claim 1 wherein said means for monitoring the change in inductance includes means for comparing said change in inductance to a predetermined threshold and providing an alarm indication in the event said change in inductance exceeds said predetermined threshold.

5. Apparatus as claimed in claim 2 wherein said coil element is secured near the opening of said borehole at the surface of said roof structure, a pulley means is secured at the base of the borehole within the roof structure and a line extends through said pulley means with one end secured to said coil element via an attachment means and the core element attached to the opposite end and suspended within said coil element.

6. Apparatus as claimed in claim 5 wherein the attachment means for securing said line to said coil element is an adjustable means permitting the predetermined positioning of said core element within said coil element.

7. Apparatus as claimed in claim 1 wherein said coil element is secured near the opening of said borehole at the surface of the roof structure, said core element being suspended within said coil element from a line which is secured to the roof structure at the base of the borehole.

8. Apparatus as claimed in claim 1 further including means for maintaining said core element within said coil element regardless of the orientation of the borehole.

* * * * *